April 19, 1932.  S. W. THOMPSON  1,854,238
INTERNAL COMBUSTION ENGINE
Filed March 20, 1930  6 Sheets-Sheet 1
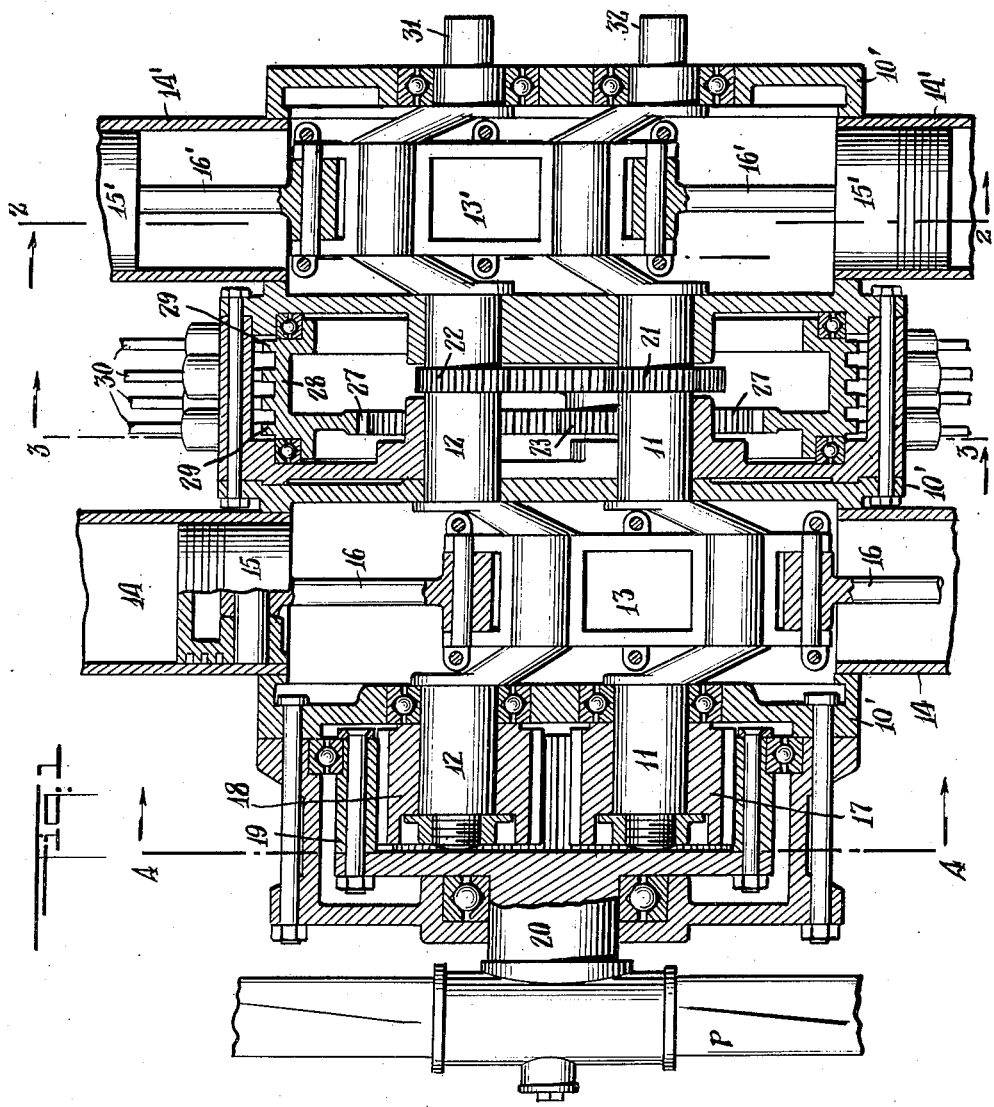
INVENTOR
Seth Waldo Thompson
BY
Robert B. Kilgore
ATTORNEY April 19, 1932. S. W. THOMPSON 1,854,238
INTERNAL COMBUSTION ENGINE
Filed March 20, 1930 6 Sheets-Sheet 2
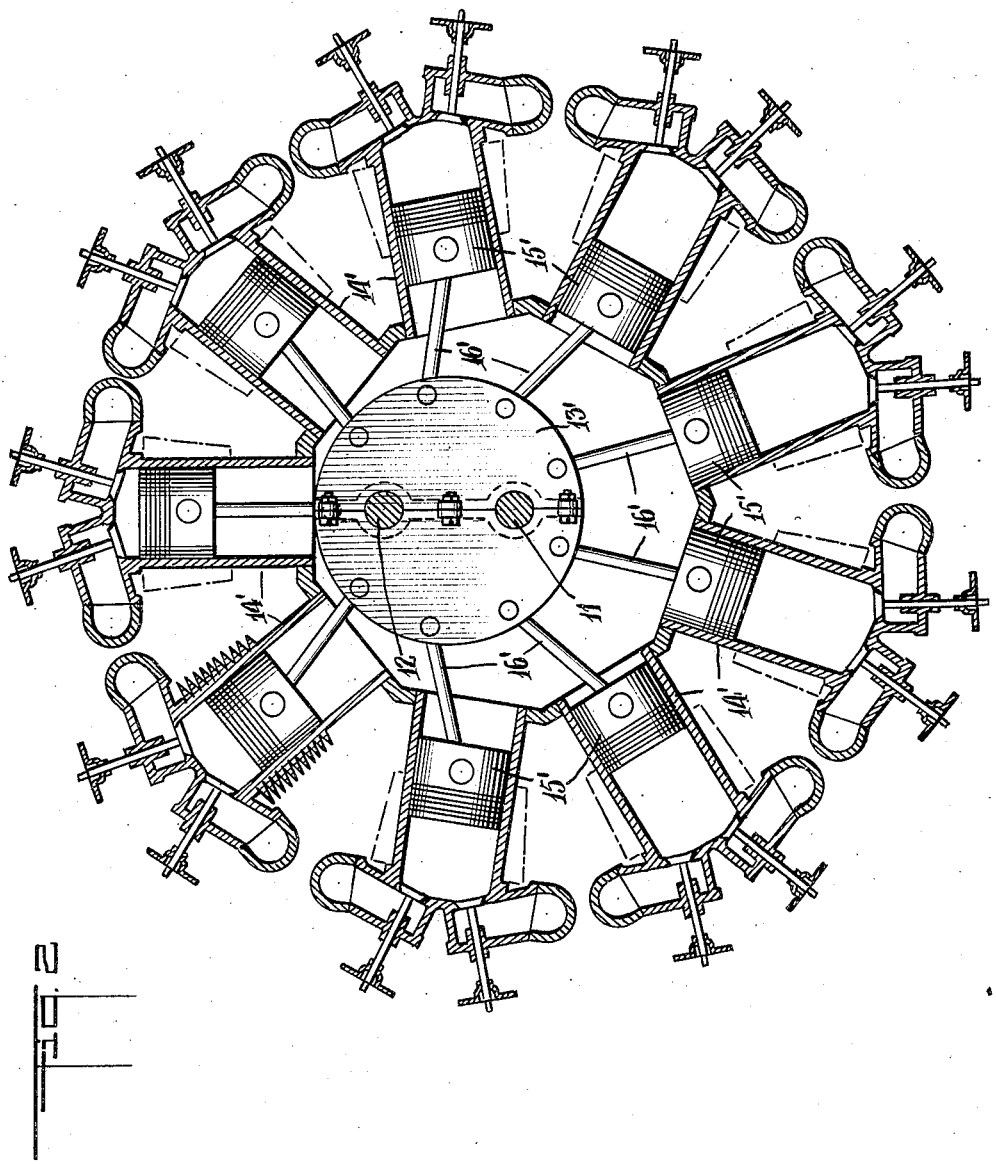
INVENTOR
Seth Waldo Thompson
BY
ATTORNEY April 19, 1932.   S. W. THOMPSON   1,854,238
INTERNAL COMBUSTION ENGINE
Filed March 20, 1930   6 Sheets-Sheet 3
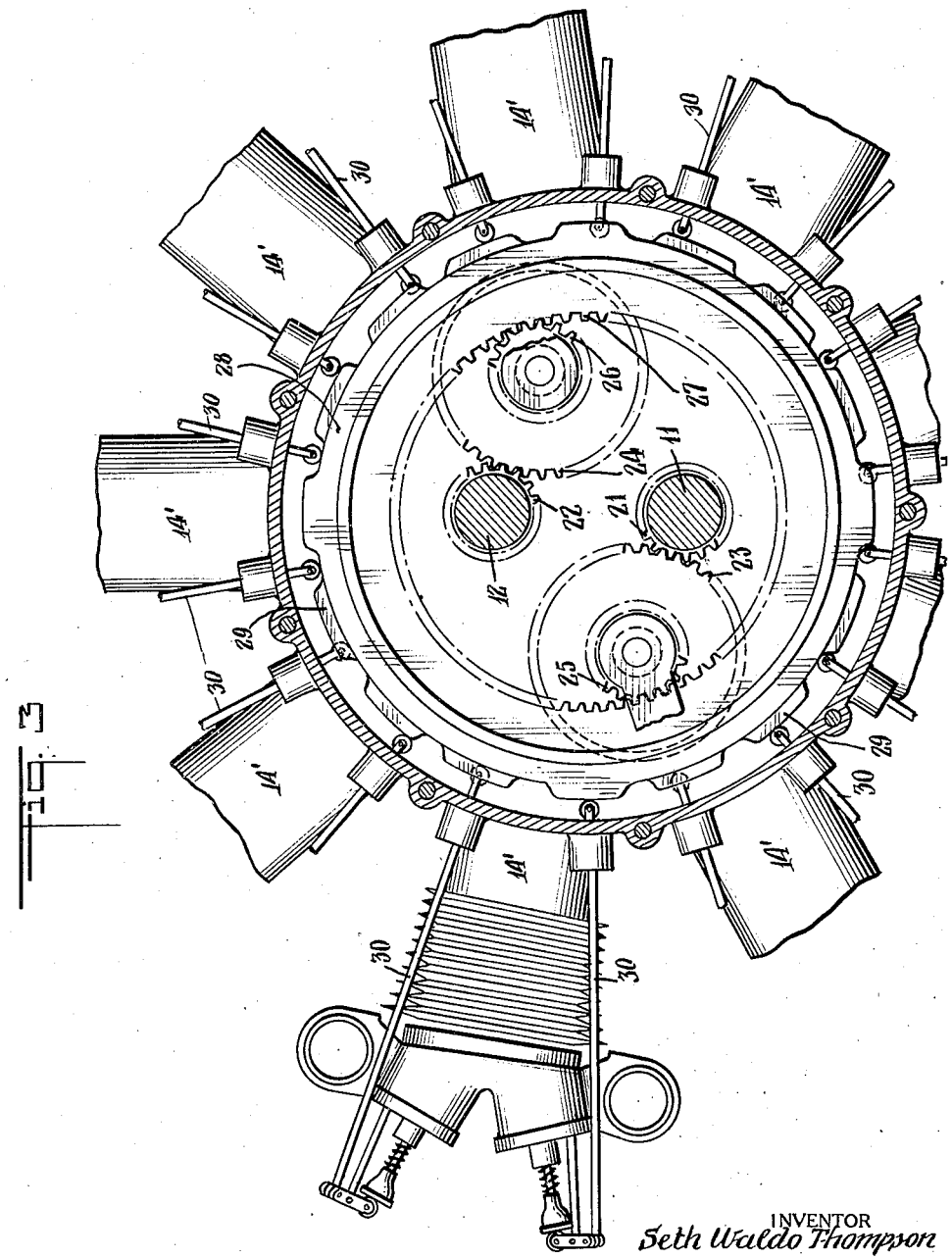
INVENTOR
Seth Waldo Thompson
BY
Robert M Lillgore
ATTORNEY April 19, 1932.  S. W. THOMPSON  1,854,238
INTERNAL COMBUSTION ENGINE
Filed March 20, 1930   6 Sheets-Sheet 4
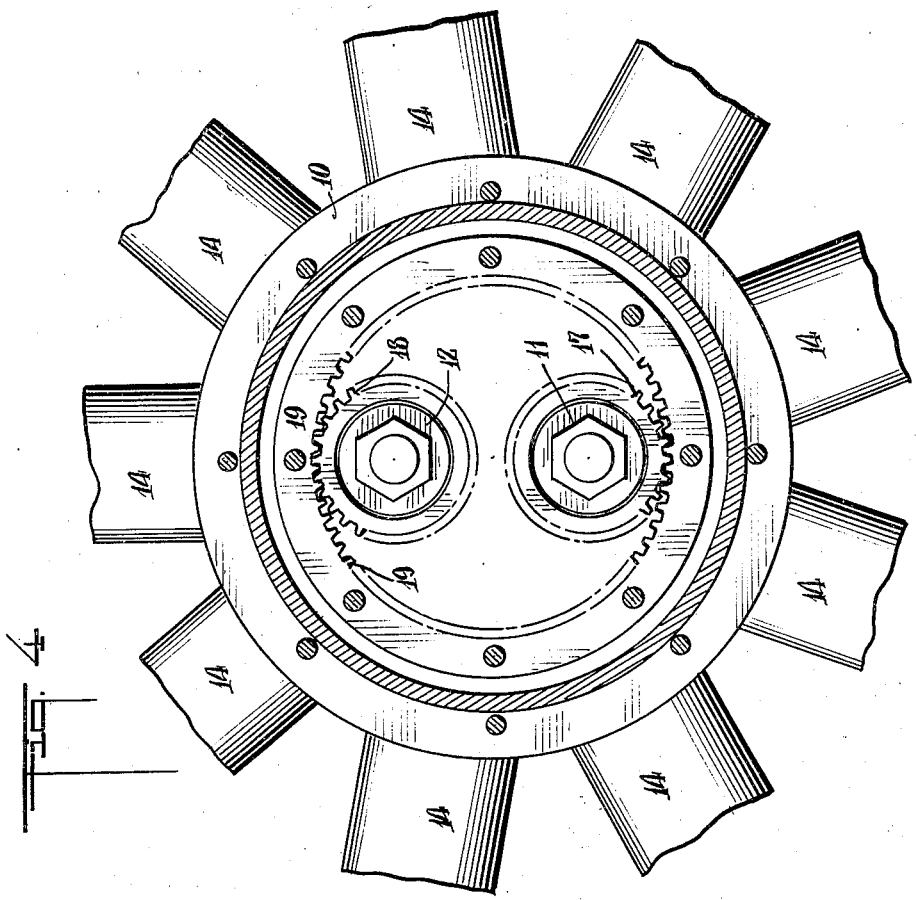
INVENTOR
Seth Waldo Thompson
BY
ATTORNEY April 19, 1932.  S. W. THOMPSON  1,854,238
INTERNAL COMBUSTION ENGINE
Filed March 20, 1930   6 Sheets-Sheet 5
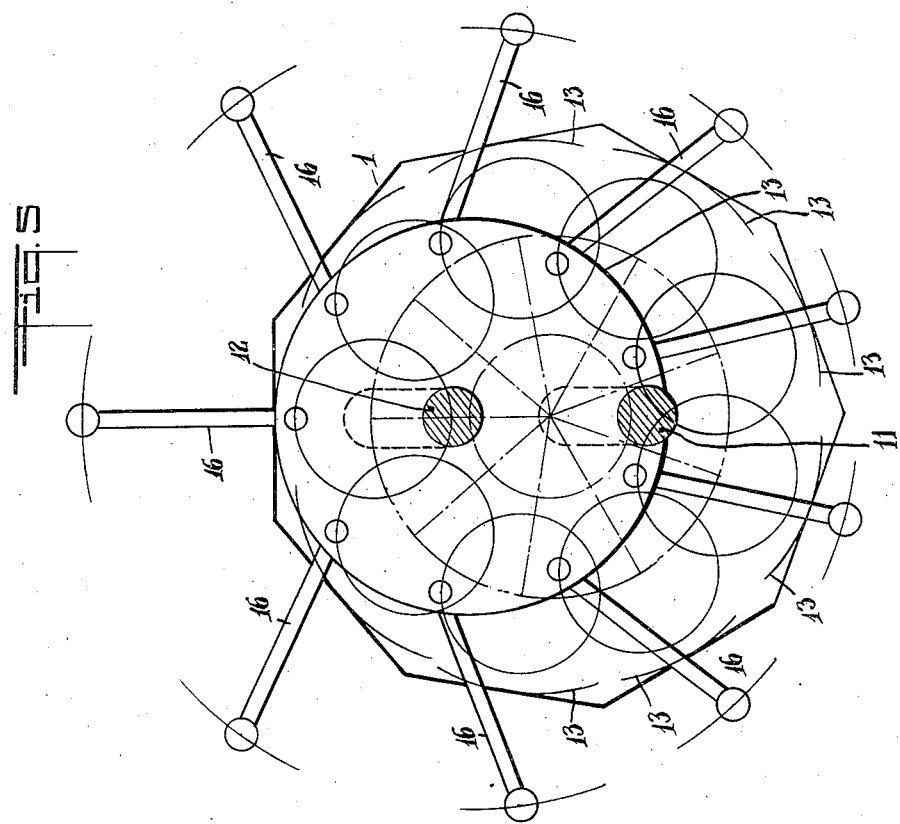
INVENTOR
Seth Waldo Thompson
BY
ATTORNEY April 19, 1932. S. W. THOMPSON 1,854,238
INTERNAL COMBUSTION ENGINE
Filed March 20, 1930 6 Sheets-Sheet 6
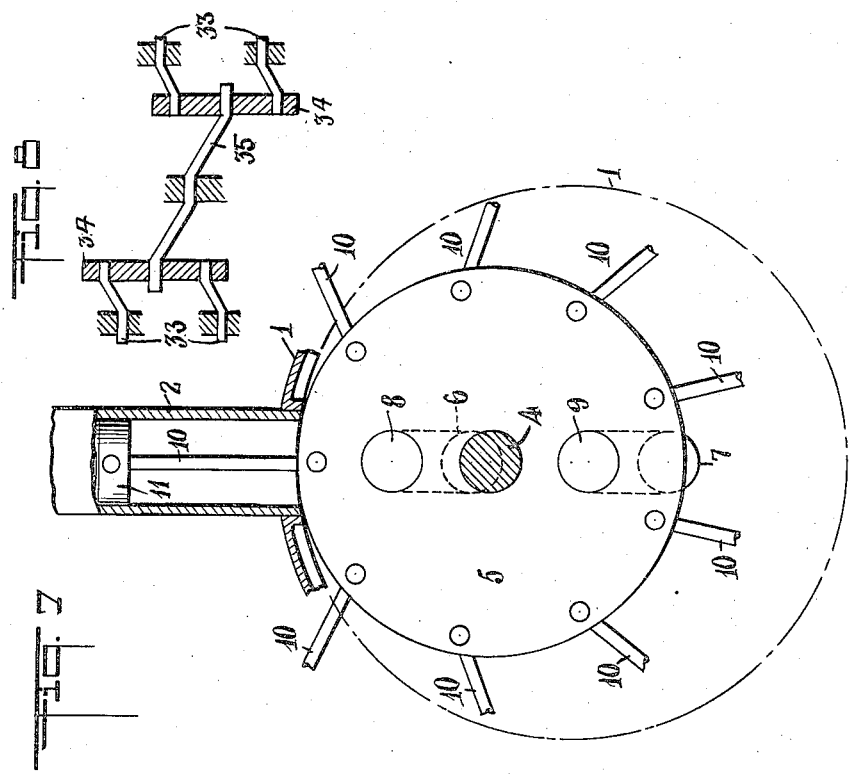
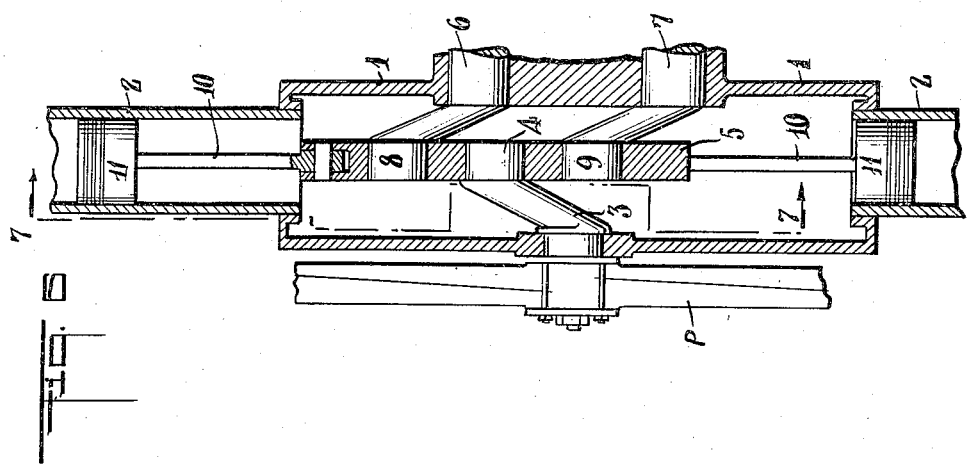
INVENTOR
Seth Waldo Thompson
BY
ATTORNEY Patented Apr. 19, 1932

1,854,238

UNITED STATES PATENT OFFICE

SETH WALDO THOMPSON, OF MONTCLAIR, NEW JERSEY

INTERNAL COMBUSTION ENGINE

Application filed March 20, 1930. Serial No. 437,436.

My invention relates to internal combustion engines in which the cylinders are arranged about a crank case and it is my object to produce an engine which will have a comparatively small overall diameter to decrease head resistance and increase visibility when used in an airplane, to eliminate the power wasting master rod ordinarily used, to reduce vibration and to increase horse power to any desired extent by adding cylinder units rather than by increasing the size of the cylinders. A further object contemplates the use of the engine gearing as a speed reduction for airplane use whereby the engine may be run at approximately 3500 revolutions per minute, the point of greater efficiency, while holding the propeller speed down to about 1500 revolutions per minute without requiring the use of separate reducing gears in common use, or any other desired proportion between engine speed and take-off speed may be obtained.

In the drawings I have shown an embodiment of my invention, the manifolds, ignition and the like being omitted, as these may be varied to meet special requirements and form no part of my invention and their use, application and functions are matters of common knowledge.

Fig. 1 is a longitudinal, sectional view of one form of my engine embodying two cylinder units; Fig. 2 a sectional view of the structure of Fig. 1 on the line 2—2 thereof; Fig. 3 a sectional view of the structure of Fig. 1 on the line 3—3 thereof; Fig. 4 a sectional view of the structure of Fig. 1 on the line 4—4 thereof; Fig. 5 a diagram showing the circular movements of the various parts whereby vibration is reduced and the master rods as used in the majority of radial engines is eliminated; Fig. 6 a sectional view of a modified form of my invention in which the underlying principle is more clearly shown; Fig. 7 an end view of the structure of Fig. 6; and Fig. 8 a diagrammatic view of a modified form of mechanism for coupling successive cylinder units.

While the drawings show an engine embodying two cylinder units of nine cylinders each any desired number of cylinders per unit and any desired number of units may be used and assembled together to obtain any desired horsepower. I prefer to use comparatively small cylinders and to increase their number, rather than their size, to obtain an engine of greater horsepower. The engine may be cooled by either air, water or chemical means. I have, so far as possible, followed standard engineering practice in connection with radial engines but have eliminated the master rod and embodied the propeller reduction gearing as an integral part of the engine.

The principle underlying my invention is best shown in Figs. 6 and 7. The crank case 1 carries the cylinders 2 radially arranged thereon. The crank shaft 3 is carried in the crank case and has its throw 4 engaged with the center of a connecting rod carrier member 5 of disk-like form. Two auxiliary crank shafts 6 and 7 are mounted in the crank case and their throws 8 and 9 engage the connecting rod carrier member on either side of the crank shaft throw 4. The connecting rods 10 are connected at their ends to the carrier member by hinge pins or the like.

It is apparent that as the explosions occur in the cylinders 2 the pistons will move out and the connecting rods 10 will push against the connecting rod carrier member 5 in turn causing it to move with a circular movement as a whole and revolve the crank shaft proper. The auxiliary crank shafts 6 and 7 will also revolve and hold the carrier member 5 to a circular path of movement as indicated by the dot and dash line of Fig. 5. These two auxiliary crank shafts perform the same functions as the master rod ordinarily used but without its drawbacks which briefly are, absorption of power and the setting up of vibration due to the constantly changing angle and distance travelled. As is clearly apparent from Fig. 5 all moving parts of my engine travel in circles so that vibration is reduced to a minimum, the pistons and connecting rods being the only exceptions to this circular movement, although the outer ends of the connecting rods move in circles.

In the commercial form of engine shown in Figs. 1, 2, 3 and 4 the foundation is a crank case 10'. Crank shafts 11 and 12 are mounted in the crank case interior and carry a connecting rod carrier member 13 on their throws. The cylinders 14, with their pistons 15 and connecting rods 16 are mounted on the outside of the crank case and the outer ends of the connecting rods are jointed to the carrier member 13. The crank shafts 11 and 12 each carry a drive gear 17 and 18 which mesh with a revolvable gear 19. The forward, central extension of the gear 19 is the point of power take off and in airplane practice may have the propeller p mounted directly thereon. The gears 17, 18 and 19 can be so proportioned that any desired ratio of engine speed to power take off speed is obtained without the introduction of further gearing.

In the form shown the valve drive comprises gears 21 and 22 mounted on the shafts of the cranks 11 and 12. These gears mesh with the gears 23 and 24 which are mounted on the crank case. Each gear 23 and 24 carries a pinion 25 and 26 which revolves with it. These pinions 25 and 26 mesh with an internal gear 27 on a cam ring 28 which revolves in the crank case. The valve operating cams 29 are arranged on the outer face of the cam ring and operate the push rods 30 which open and close the valves. The gearing is such that the cam ring makes one revolution to eight revolutions of the connecting rod carrier member. Any other system of valves and valve operation may be substituted for that shown and described without departing from my invention.

In a two row engine, such as illustrated, the crank shafts have two throws each as shown in Fig. 1 and the connecting rod carrier member is duplicated on the second throw to receive the connecting rods of the cylinders on the second unit. The reference numbers of corresponding parts being primed in Fig. 1. It is clear that as many units, or rows of cylinders, as desired may be added, thus increasing the horse power of the engine without increasing the size of the cylinders, thus keeping the overall diameter of the engine at a minimum to reduce head resistance and increase visibility from a pilot's seat. Each increase in the number of cylinder units requires the addition of a crank throw to each crank shaft.

The projecting ends 31 and 32 of the crank shafts may be used to drive the accessories, such as super-chargers, magnetos, water pumps or distributor heads.

If desired the valve drive may be divided and located outside the cylinder lines instead of between them as shown, in which case each unit will be integral with its own valve gearing instead of being arranged to operate on pairs of units.

By my construction the gears may be made with wide faces and due to their small size the peripheral speed is low so that they will efficiently carry the load imposed on them.

In Fig. 8 I have shown how successive cylinder blocks or units may be coupled by the use of stub auxiliary crank 33, a pair to each connecting rod carrier member 34, the carrier members 34 being connected by a double throw crank shaft 35.

By the term "internal combustion engine" in the claim I include the customary crank case, cylinders, positions, connecting rods, valves, valve operating mechanism, manifolds, ignition devices and the like necessary to make up an operative engine embodying my invention where such elements are not specifically included.

I claim:

The combination of a pair of rotary crank shafts, a circular series of cylinders cooperating pistons and transmission means between the pistons and the rotary shafts comprising connecting rods, a connecting rod yoke to which the ends of the connecting rods are attached, said yoke being mounted on the throws of the crank shafts, a gear on each of said crank shafts, an internal gear meshing with both of said crank shaft gears, and a power take-off shaft centrally mounted on said internal gear.

In testimony whereof I have hereunto affixed my signature.

SETH WALDO THOMPSON.